Patented Mar. 13, 1928.

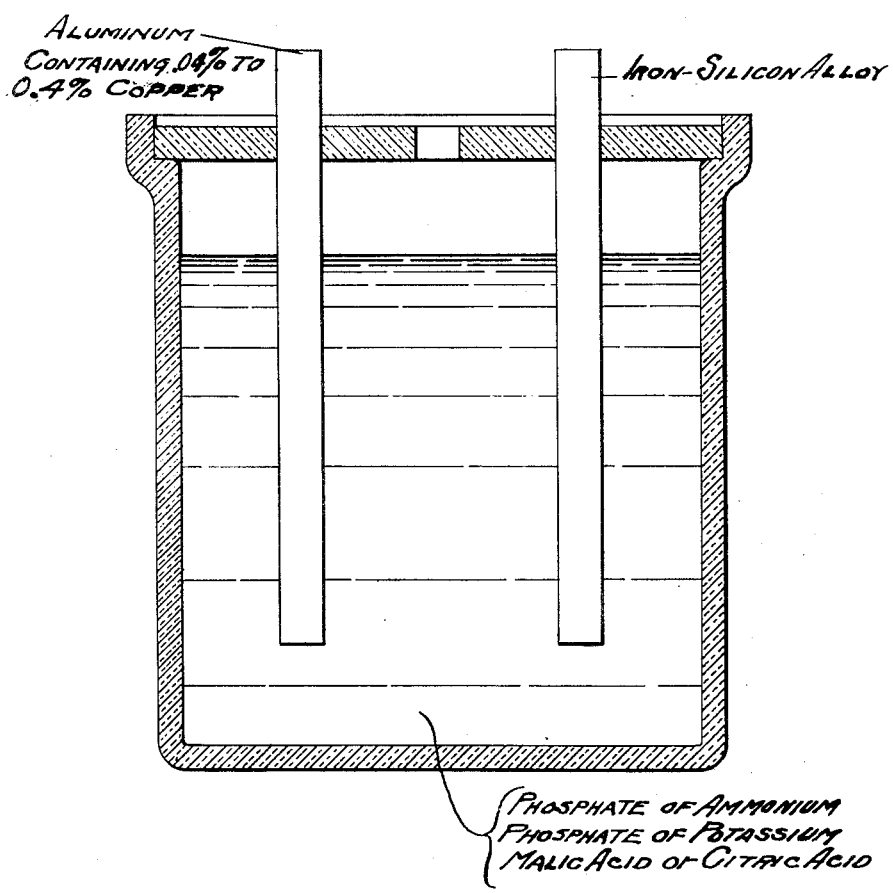

1,662,383

UNITED STATES PATENT OFFICE.

WILLIAM H. GRIMDITCH AND JOHNSON N. HUNSBERGER, JR., OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

ELECTROLYTIC RECTIFIER.

Application filed February 18, 1927. Serial No. 169,274.

This invention relates to improvements in asymmetric cells, and more particularly in that type of cell which includes a film-forming electrode of aluminum.

The principal object of the invention is to provide an asymmetric cell, and particularly a rectifier cell, which by reason of the excellence of its individual component elements, and of the combination of these elements, will show a relatively great efficiency in operation and a sustained effectiveness exceeding other cells of the same class. To this end the invention contemplates the provision of an aluminum electrode that will function with the maximum efficiency of which this type of electrode is capable.

We have discovered that an alloy of aluminum with a predetermined relatively small percentage of copper affords markedly improved results over the purest aluminum obtainable and also over aluminum electrodes containing larger amounts of copper. We have found that a deficiency of copper results in the formation of a film of relatively high resistance having a tendency to insulate the electrode and prevent the normal passage of current; whereas an excess of copper in the electrode results in a film which breaks down relatively easily and in an electrode which is unduly subject to corrosion.

We have determined that in these respects the electrode is noticeably defective when copper is present in quantities less than .04% by weight and greater than .4%, whereas between these limits the presence of copper noticeably improves the performance characteristics of the electrode. It is found, for example, that with a copper content ranging between .04% and .4% an aluminum electrode is capable under given conditions of delivering more rectified current than when the copper is present in lesser or greater proportion. Such an electrode also will operate at higher voltages without sparking and will show less pitting and wear for a given amount of use than a similar electrode of purest aluminum in a similar rectifier cell.

As an example of an electrolytic solution with which the aforedescribed electrode may be successfully used we may name a mixture of the phosphates of ammonium and potassium, with a mild organic acid such as malic or citric; and an opposite electrode consisting of iron containing say 14% of silicon is particularly desirable. A rectifier cell so constituted is illustrated in the attached drawing.

It will be understood, however, that the exact compositions of the electrolyte and of the second electrode are not essential and that an improved aluminum electrode will function advantageously with many types of electrolyte and with companion electrodes other than that mentioned.

We claim:

1. A rectifying electrode for asymmetric cells consisting of aluminum containing from .04% to .4% of copper.

2. A rectifier cell including an electrode of aluminum containing .04% to .4% of copper.

3. A rectifier cell including an electrode of aluminum containing .04% to .4% of copper in an electrolyte containing phosphates and organic material.

4. An asymmetric cell including an electrode of aluminum containing from .04% to .4% of copper in an electrolyte containing phosphates of ammonium and potassium.

5. An asymmetric cell including an electrode of aluminum containing from .04% to .4% of copper in an electrolyte containing phosphates of ammonium and potassium, together with an organic material.

6. An asymmetric cell including an electrode of aluminum containing from .04% to .4% of copper in an electrolyte containing phosphates of ammonium and potassium and citric acid.

WILLIAM H. GRIMDITCH.
JOHNSON N. HUNSBERGER, JR.